United States Patent [19]

Lagares-Corominas

[11] Patent Number: 5,507,221
[45] Date of Patent: Apr. 16, 1996

[54] NEEDLE FOR THE SPRAY INJECTION OF BRINE INTO MEAT PIECES

[75] Inventor: Narciso Lagares-Corominas, Besalu, Spain

[73] Assignee: Metalquimia, SA, Girona, Spain

[21] Appl. No.: 508,890

[22] Filed: Jul. 28, 1995

[30] Foreign Application Priority Data

Aug. 5, 1994 [ES] Spain ................... 9401770

[51] Int. Cl.⁶ ................ A22C 9/00; A22C 17/00; A23L 1/31; A23L 3/34
[52] U.S. Cl. ................... 99/532; 99/487; 99/535
[58] Field of Search ............ 99/516–517, 532–535, 99/494, 487, 486; 426/281, 652, 231, 264; 452/141, 142, 174, 198; 111/92; 27/24.1

[56] References Cited

U.S. PATENT DOCUMENTS

| | | | |
|---|---|---|---|
| 2,544,316 | 3/1951 | Higgins | 99/532 |
| 2,602,391 | 7/1952 | Pedranti et al. | 99/532 |
| 3,530,785 | 9/1970 | Peters et al. | 99/532 |
| 3,754,469 | 8/1973 | Gasior | 99/494 |
| 4,129,066 | 12/1978 | Corley | 99/345 |
| 4,178,660 | 12/1979 | Olney et al. | 99/450.8 |
| 4,331,071 | 5/1982 | Niccolls | 99/535 |
| 4,622,892 | 11/1986 | Lagares-Corominas | 99/533 |
| 4,690,046 | 9/1987 | Lagares-Corominas | 99/535 |
| 4,864,922 | 9/1989 | Higashimoto | 99/533 |
| 4,953,456 | 9/1990 | Prosenbauder | 99/535 |
| 5,269,216 | 12/1993 | Lagares-Corominas | 99/483 |

FOREIGN PATENT DOCUMENTS

| | | |
|---|---|---|
| 38947 | 2/1972 | Australia. |
| 2366797 | 10/1976 | France. |
| 2470545 | 12/1979 | France. |
| 1193072 | 10/1969 | Germany. |
| 541930 | 8/1970 | Switzerland. |
| 1629017 | 2/1991 | U.S.S.R.. |

Primary Examiner—Timothy F. Simone
Attorney, Agent, or Firm—Jacobson, Price, Holman & Stern

[57] ABSTRACT

A needle for the spray injection of brine into meat pieces. It comprises a tubular body (1) provided with an axial duct (2) with radial holes (3) being distributed along the tubular body of the needle and piercing its wall right through, having a diameter which is apt to assure the spraying of the brine under pressure. A holding end portion (4) is connected to an end of the body (1) and provided with a fastening zone (5), and a pointed tip (6) is connected to the other end of said body (1). An upper wall of the tip (6) connected to the lower end of the axial duct (2), comprises a plane (7) in the shape of an inclined trough or bowl whose profile shows a width which decreases from top to bottom, in such a way that its lower profile or bottom ends in a flushing connection with the lower part of the inner wall of the radial hole (3) which is closest to the needle pointed tip (6).

4 Claims, 1 Drawing Sheet

NEEDLE FOR THE SPRAY INJECTION OF BRINE INTO MEAT PIECES

BACKGROUND OF THE INVENTION

This invention relates to a needle for the spray injection into meat pieces of brine obtained from a series of additives and/or ingredients which are indispensable for the process of curing the meat pieces, generally baked ham or shoulder meat, in order to assure the colouring and the flavour, of the type comprising a tubular body provided with an axial duct with radial holes having a diameter which is apt to assure the spraying under pressure, said holes being distributed along the tubular body of the needle and piercing its wall right through, a holding end portion connected to an end of said tubular body and provided with a fastening/gripping zone, and a pointed tip connected to the other end of said tubular body.

As publications of prior art can be cited patents SU-A-1 629 017, FR 2 470 545, CH-A-541 930, AU-D894 772, FR-A-2 366 797, DE-A-19 13 072 and U.S. Pat. No. 4,690,046.

The known needles of this kind are of two types depending on the existing operating procedures (mode of injecting the brine into the meat):

a) the low-pressure process (with pressures of the order of 4 kg/cm2) which uses needles having in general 2 or 4 orthogonal radial holes with a diameter of the order of more than one millimetre, said needles depositing the brine during the passage of the needle through the meat, thereby forming brine deposits which must be thereafter spread by mechanical action. With this process the use of higher pressures would damage the structure of the meat, since the jet would cause the separation and even the rupturing of the meat fibres;

b) the high-pressure process (with pressures of the order of 8 to 12 kg/cm2), more effective, which uses needles with a bigger number of radial holes, in general from 11 to 14, distributed at different heights along the needle body, said holes having a smaller diameter, generally of the order of some 0.6 mm, the brine being spray injected under pressure once the needles have been arrested in position once having been driven into the meat piece. Thus once the needles have been driven into the meat piece and have been arrested at the end of their travel the brine is then injected into the meat with a "spray" or "nebulizator" effect, thereby introducing into the mass of meat a volumetrically dosed quantity of brine which is distributed in a very homogeneous way throughout the whole meat piece.

In both solutions the brine excess is recycled thus causing, because of the meat microfibres it contains, the clogging of the holes, and mainly of the last one at the lowest part in the vicinity of the needle tip (an important part of the meat piece hence not receiving any sprayed brine), this complicating the regular needle cleaning tasks which are mandatory. This phenomenon is all the more important (difficulty of the cleaning and clogging frequency) the smaller the needle holes are.

The clogging of the hole which is closest to the needle tip determines an accumulation of residual matter on it which is hardly eliminable when cleaning the needle, and this can cause on the long term the clogging of the other holes and determines besides a pressure increase at the remaining open holes of the needle, with the consequent irregularities in the brine distribution.

BRIEF SUMMARY OF THE INVENTION

The invention seeks to provide needles, mainly for the above-mentioned pressure spray injection process, which minimize the clogging of the lowest hole and hence any clogging in general, and which therefore simplify the corresponding needle cleaning tasks thus providing a better performance (a more homogeneous injection) and a reduction of the downtimes (economy).

In this way it becomes possible to obtain the full efficiency of the pressure spray injection process, which allows:

a more homogeneous distribution of the brine, thus allowing the latter to penetrate the muscle fibres in form of microdrops without damaging them, avoiding the brine deposits between fibres;

a higher accuracy of the injected brine percentage;

a better cleaning of the needles (with the new needles).

For such a purpose the invention provides needles in which:

the bottom of the axial duct, which is constituted by the upper wall of the pointed tip connected to the lower end of said cavity, comprises a plane in the shape of an inclined trough whose profile shows a width which decreases from top to bottom, in such a way that its bottom ends in a flushing connection with the lowest part of the inner wall of the radial hole which is closest to the needle tip;

each cylindrically shaped radial hole comprises a bell-mouthed section its mouth leading to the outside of the cylindrical body, said section being of a shorter length with respect to that of the corresponding cylindrical part.

The above and other objects, advantages and features of the present invention will become more apparent from the following detailed description of a preferred embodiment thereof given by way of a nonlimiting example.

BRIEF DESCRIPTION OF THE DRAWINGS

The invention will now be described in detail with reference to the accompanying drawings wherein.

DETAILED DESCRIPTION

Figure 1:
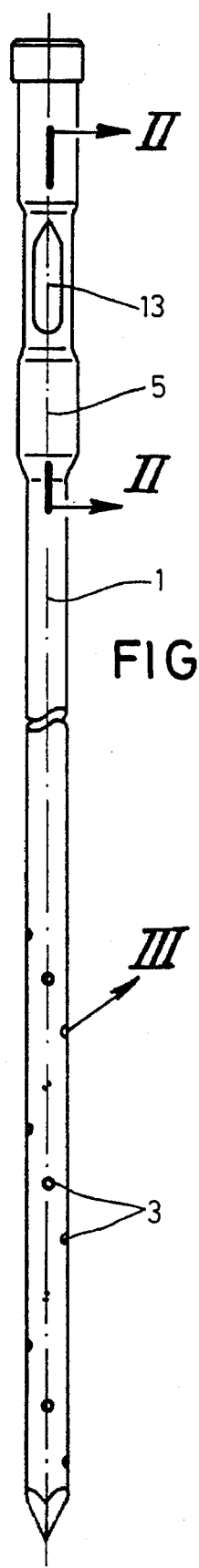
FIG. 1 is an outside view of the needle.
Figure 2:
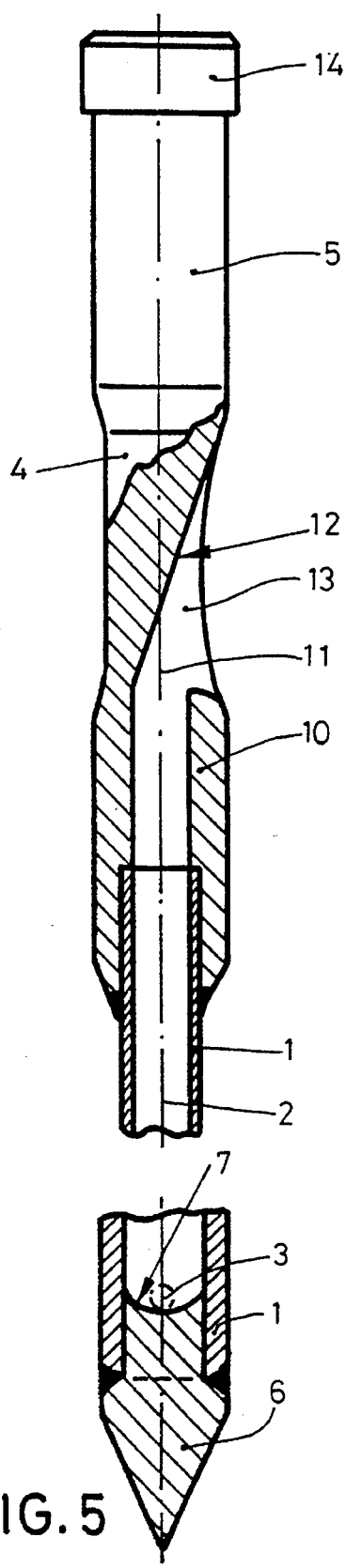
FIG. 2 is a part-sectional elevation of the connection of the holding end portion with the needle.
Figure 3:
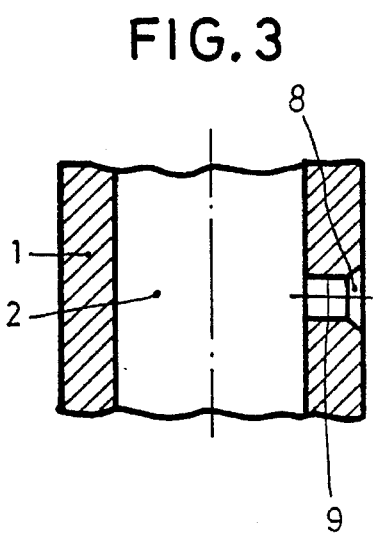
FIG. 3 is an enlarged sectional detail of a radial hole.
Figure 5:
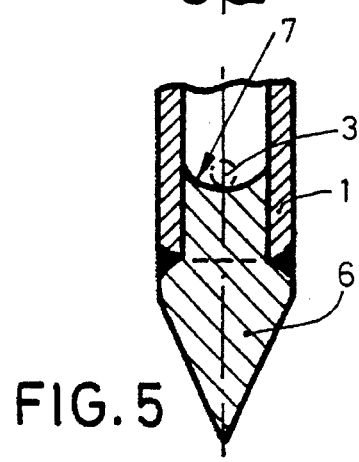
FIG. 5 is a detail view sectioned along section line V—V in FIG. 4.

The needle shown in the drawings comprises a tubular body (1) provided with an axial duct (2) and radial holes (3) having a diameter which is apt to assure the spraying under pressure, said holes being distributed at different heights along the wall of the needle body and piercing said wall right through, a holding end portion (4) connected to an end of said tubular body (1) and provided with a fastening zone (5), and a pointed tip (6) connected to the other end of said tubular body.

Figure 4:
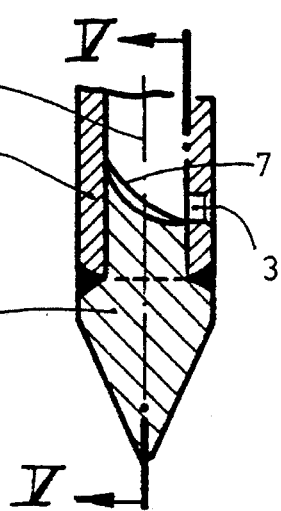
FIG. 4 is an enlarged sectional detail of the connection of the pointed tip with the needle.

The bottom of the axial duct (2), which is constituted by the upper wall of the tip (6) connected to the lower end of said axial duct, comprises a plane (7) in the shape of an inclined trough or bowl whose profile shows a width which decreases from top to bottom, in such a way that its lower profile or bottom ends in a flushing connection with the lower part of the inner wall of the radial hole (3) which is closest to the needle tip, as can be clearly appreciated in FIG. 4.

Each radial hole (3) comprises a cylindrical section (9) ending in the inside of the axial duct (2) and being at its other end followed by a bellmouthed section (8) ending in the outside of said wall (1) and having a reduced axial length as compared with the axial length of the cylindrical portion (9).

The tubular body (1) is associated to a holding end portion (4) by way of a tubular portion (10) provided with a duct (11) situated such that it forms an extension of duct (2) and leading laterally to the outside of the holding end portion (4) thereby following a steplessly inclined profile (12) and ending in opening (13).

The holding end portion (4) comprises a differentiated cylindrical zone (14) which is apt to receive inscriptions relative to the nature of the needle used, and in particular a reference to its nonclogging quality, or to the simple cleaning of its holes, as per the previously described construction.

The lateral injection opening (13) is surrounded by a sleeve (not shown) comprising a lateral injection intake.

The needles are generally fixed on a head which carries a plurality of needles (multineedle head).

The lower hole (3) must be situated at the lowest possible level (closest to the end (6)) for the spraying to reach all parts of the meat piece. The homogeneous distribution of the brine conditions the resulting quality of the meat pieces. In effect, an irregular distribution will give rise to an excess or lack of brine entailing changes in the colour, flavour and consistency of the meat piece.

It is pointed out that the invention is not limited to the herein described and illustrated embodiment examples, for which other alternative executions can be contemplated, in particular as regards:

the number and the peripheral distribution of the radial holes;

the shape of the gripping and marking zone of the needle;

the conception of the connection of the needle with the holding end portion;

without therefore issuing outside the scope of the invention.

I claim:

1. A needle for the spray injection into meat pieces of brine obtained from a series of additives and/or ingredients which are indispensable for the process of curing said meat pieces, in order to assure the colouring and the flavour thereof, comprising:

a tubular body provided with an axial duct with radial holes being distributed along said tubular body and piercing its wall right through, said holes having a diameter which is apt to assure a spraying of the brine under pressure;

a holding end portion connected to a first end of said tubular body and provided with a fastening zone;

a pointed tip connected to a second end of said tubular body;

a bottom of said axial duct, which is constituted by an upper wall of the said pointed tip connected to said second end of said axial duct, comprises a plane in the shape of an inclined trough or bowl whose profile shows a width which decreases from top to bottom, in such a way that its lower profile or bottom ends in a flushing connection with a lower part of the inner wall of said radial hole which is closest to said pointed tip.

2. A needle, as per claim 1, wherein each radial hole piercing said wall of said tubular body comprises a cylindrical portion ending in the inside of said axial duct and being at its other end followed by a bellmouthed section ending in the outside of said wall and having a reduced axial length as compared with the axial extent of said cylindrical portion.

3. A needle, as per claim 1, wherein said tubular body is associated to said holding end portion by way of a tubular portion provided with a duct situated such that it forms an extension of said axial duct and leading laterally to the outside of said holding end portion thereby following a steplessly inclined profile and ending in an opening.

4. A needle, as per claim 1, and further comprising a differentiated cylindrical zone terminating said holding end portion, which is apt to receive inscriptions relative to the nature of the needle used.

* * * * *